Figure 1:
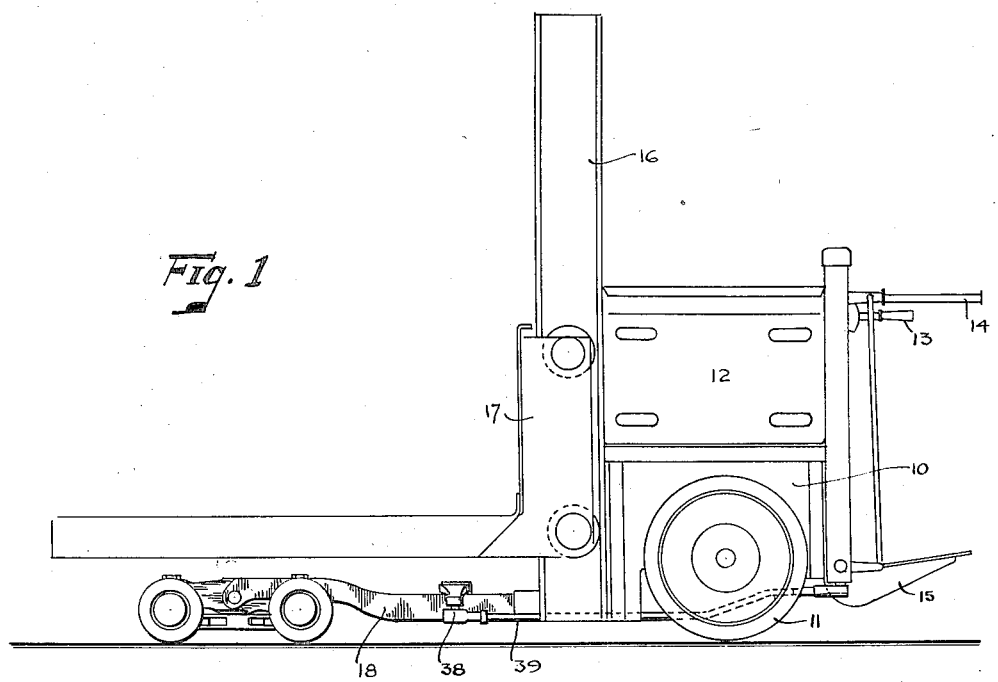

April 30, 1935.  C. S. SCHROEDER  1,999,665

TRUCK

Filed Sept. 11, 1930  2 Sheets-Sheet 1

INVENTOR
Charles S. Schroeder
BY
A. H. Golden
ATTORNEY

April 30, 1935.   C. S. SCHROEDER   1,999,665
TRUCK
Filed Sept. 11, 1930   2 Sheets-Sheet 2
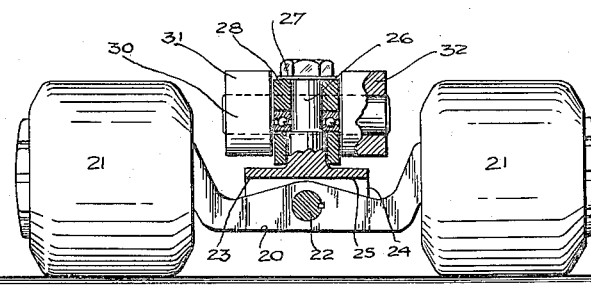
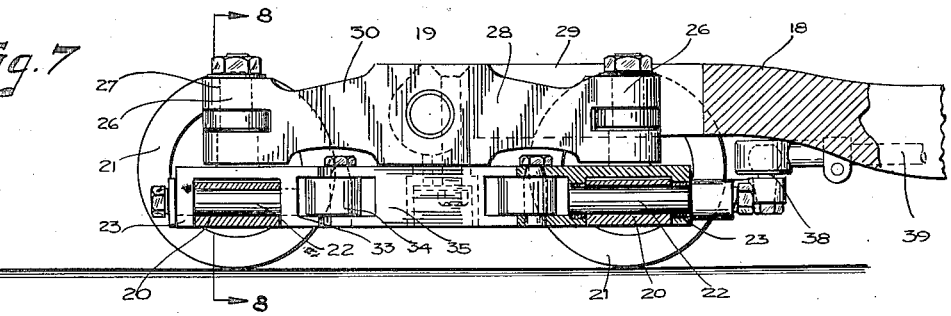
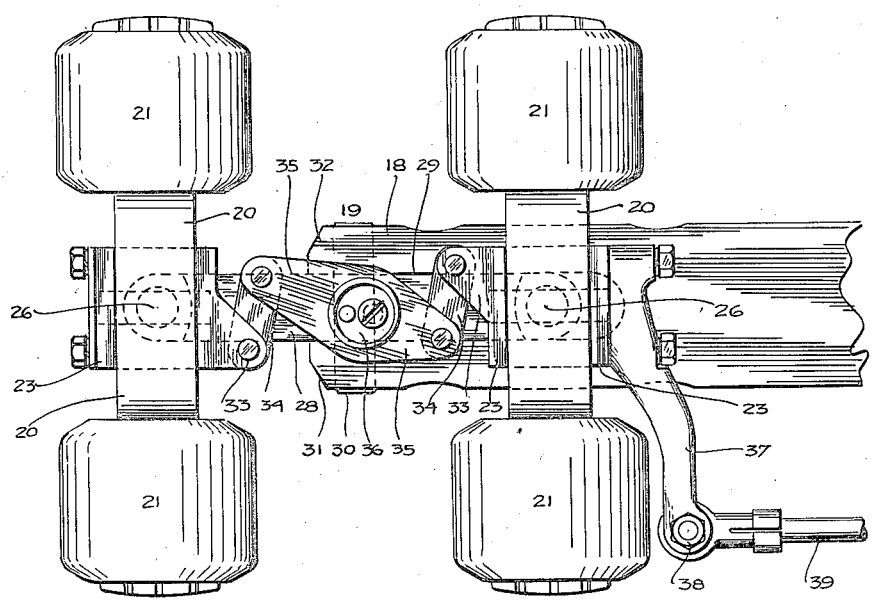
INVENTOR
Charles S. Schroeder
BY
A. H. Golden
ATTORNEY Patented Apr. 30, 1935

1,999,665

UNITED STATES PATENT OFFICE 1,999,665

TRUCK

Charles S. Schroeder, Stamford, Conn., assignor to The Yale & Towne Manufacturing Company, Stamford, Conn.

Application September 11, 1930, Serial No. 481,206

18 Claims. (Cl. 280—91)

This invention relates to electric trucks. More especially it relates to means for mounting load supporting wheels relatively to the frame member of an electric truck and to means for steering those wheels.

It is well known in the art of electric trucks, that heavy trucks adapted to carry tremendous loads of 10,000 lbs. and more, must use four wheel units to carry the load supporting portion of the truck. If only two wheels are used, the load is borne by those two wheels, with the result that the same may break through the floor or way along which the truck travels.

In the four wheel type of truck the four wheel units usually comprise a pair of axes which are borne by a beam member which in turn is pivoted to the truck about a transverse pivot. Thus, each of the axles is adapted to pivot on a transverse axis so that the wheels on the axles may conform to the way traversed by the truck. Furthermore, each of these axles is pivoted relatively to a beam member about a longitudinal axis relatively to the truck so that the wheels may assume different positions to conform to the transverse angularity of the road or way traversed by the truck.

For steering these trucks of the prior art, each of the four wheels of the unit assembly is dirigible relatively to its axle and is operated by steering mechanism connected with means on the operating platform of the truck so that the operator may steer all four wheels at the same time.

It may be said, therefore, that these trucks of the prior art have wheels which are mounted for universal movement relatively to the truck, since they are mounted for movement about a vertical axis for steering, about a longitudinal axis on the beam member, and about a transverse axis on the truck itself.

It is the object of my invention to change radically the construction of the prior art so that the wheels are mounted rigidly on their particular axles, and the axles themselves are mounted for universal tractive movement relatively to the truck. Steering is done through the axles, the universal movement of which allows for the necessary adjustment of the wheels relatively to the truck while moving along any particular way or road.

By doing away with the dirigible mounting of each wheel relatively to its axle, it is possible to obtain a relatively large wheel bearing surface, without, at the same time, spreading the wheels apart to lengthen the axle and consequently weaken the truck. It is also possible to obtain a much cheaper construction without the sacrifice of strength, efficiency, and ease in the steering operation.

It is a further object of the invention to devise a new type of load carrying frame member embodying a solid beam construction which may be easily fabricated. This beam need not be formed with any interior cutout portions, or be drilled in any manner to weaken the same, but is so arranged that it will permit of easy mounting of the four wheel assembly and of the steering apparatus.

Figures 2, 3:
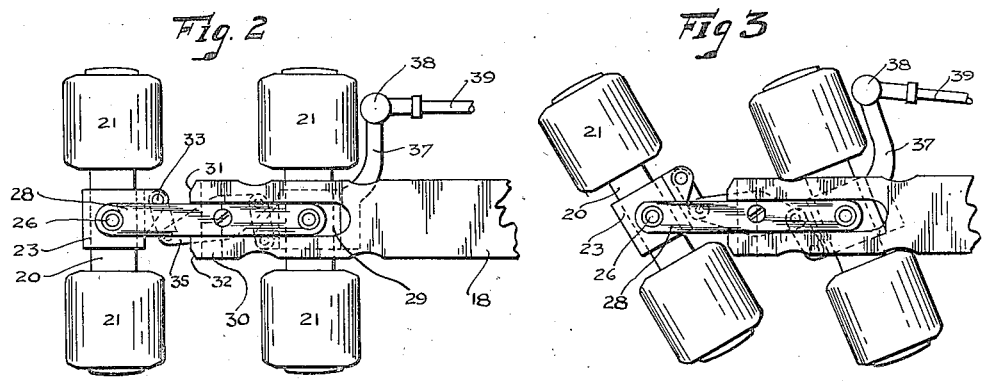
Figure 4:
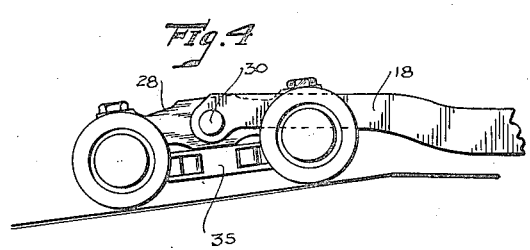
Figure 5:
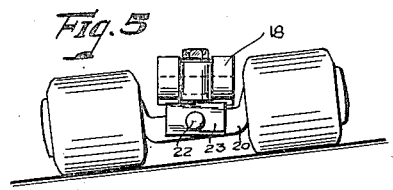

Further objects of my invention will be readily apparent from a study of the following specification and the drawings wherein Fig. 1 is an elevation of an electric truck showing the invention applied thereto. Fig. 2 is a plan view of the four wheel assembly. Fig. 3 is a view similar to Fig. 2 showing the operation of the steering mechanism. Fig. 4 shows the operation of the four wheel assembly on an inclined way. Fig. 5 shows the operation of the four wheel assembly on an inclined way at right angles to that of Fig. 4. Fig. 6 is a bottom view of my rear wheel assembly in enlarged form showing the application of the steering mechanism thereto. Fig. 7 is an elevation and partial section of my invention. Fig. 8 is a section along the lines 8—8 of Fig. 7.

Referring now more particularly to the drawings, reference numeral 10, indicates a standard type of electric truck having a pair of forward wheels 11, a power unit 12, a controller 13, and a steering lever 14. The truck is also equipped with the usual platform 15, a pair of vertical standards 16 and a lifting platform 17 slidable thereon.

The rear or load supporting portion of the truck comprises a solid forged beam-like member 18 of substantial cross section which is secured to the forward end of the truck and extends rearwardly to support the rear load supporting and steering wheel assembly 19.

Referring now to Figures 6, 7 and 8, I will describe in detail the construction of my rear wheel assembly 19 and the steering mechanism associated therewith. It will be noted that I use a pair of axles 20 which support at their ends the wheels 21, which may be suitably mounted thereon by any type of long substantial bearings well known in the art. This particular construction allows for the use of an extremely long bearing surface so that great loads may be sustained without lengthening the axle any undue amount. Each one of these axles 20 is mounted on a pivot 22 supported in a bearing member 23. This bearing 23 is cut out at 24 (Fig. 8) and is equipped with a shoulder 25 which cooperates with the axle 20 to limit its movement relatively thereto. From the above description of the mounting of the axle 20, it is readily seen that it will be mounted for movement about a longitudinal pivot relatively to the truck.

It is, of course, understood that there are two of these bearing members 23, each of which is equipped with a vertical post 26 which is adapted to traverse a bore 27 in a beam member 28. It will be readily understood that this bearing member 23 will be rotatable on its pivot 26 in this beam member 28 and will rotate with it the axle 20 and the wheels 21. Thus, due to the fact that each bearing 23 is mounted in this manner, it may be said that the wheel axles 20 are mounted to rotate about a vertical pivot relatively to the truck, said pivot being adapted to traverse a point midway of each axle.

The beam member 28 which supports each of the bearing members 23 is carried by the longitudinally extending bar 18 constituting the frame and load supporting portion of the truck. The member 18 is cut out at 29 at its end so as to permit movement of the beam member 28. This beam member is mounted on a pivot 30 which is, in turn, supported by the two end members 31 and 32 formed in the frame beam 18 by the cutout portion 29. It will, of course, be readily understood that the beam member 28 will be permitted to pivot on this transverse axis 30 and will carry with it the bearings 23 and their two axles 20. It may be said, therefore, that due to this mounting of the beam 28, the axles will be permitted to move about a transverse pivot relatively to the truck in addition to the other two pivots already pointed out.

As has been previously described, the wheels 21 are each mounted on long bearings on the axle 20 so as to be mounted for rotary movement only instead of being dirigible relatively to the axles as in the prior art. For steering the truck, the axles themselves are each rotated about a vertical pivot 26, already described, by a unit type of steering mechanism which will now be pointed out in detail.

In order to secure the truck steering mechanism relatively to the axles, the bearing members 23 are each equipped with ears 33 to which may be pivotally secured the link member 34, this link member in turn being pivoted to a rotary member 35. This rotary member 35 is in turn pivoted at 36 to the beam member 28 for movement thereon. It will be observed, in Fig. 6, that the right hand arm of the rotary member 35 is shorter than the left hand arm. This arrangement is such as to allow for a greater throw of the left or rear axle 20 than the right or front axle 20, so as to give a correct steering movement as will be readily understood by those skilled in the art.

Secured to the right hand or forward bearing member 23 of Fig. 6 is the arm 37 which is adapted to move the rear bearing 23 through the linkage 34, 35. The steering mechanism is therefore adapted to rotate the axles 20 about their vertical pivots 26 whenever movement is transmitted to the arm 37. This arm 37 is connected by a ball and socket joint 38 to the steering rod 39 going to the forward end of the truck and connected there by some universal joint to the steering lever 14 previously indicated. By this arrangement of elements, it is readily seen that in any angle of the wheels relatively to the truck, a steering impulse may be transmitted to the same through the various universal connections.

Referring now to Figs. 2, 3, 4 and 5, I show my rear wheel assembly in its various positions. In Fig. 2, the wheels and axles are shown in their neutral position aligned so that the truck moves forward in a straight line. In Fig. 3, I show the wheels and axles rotated in an angular direction by the steering mechanism so as to steer the truck in the particular direction desired. In Fig. 4 I show the automatic adjustment of the axles to the way traversed by the truck. In this particular figure, the adjustment is about the pivot 30 upon which the beam member 28 is mounted relatively to the rearwardly extending bar 18 constituting the frame of the truck. In Fig. 5 I show the adjustment of the axles 20 relatively to the way traversed by the truck, and about the longitudinal pivot 22 carried by the bearing member 23.

It is, therefore, seen that my axles are movable about the vertical pivot 26 as shown in Fig. 3, the transverse pivot 30 as shown in Fig. 4, and the longitudinal pivot 22 as shown in Fig. 5. It is also readily seen that the unique mounting of the steering mechanism is adapted to actuate the axles when they are in any particular position, or when the wheels and axles are aligned in any particular plane. Further explanation is thought to be unnecessary.

While I have shown but one modification of my invention, it should be understood that variations in the same within the scope of the appended claims, will readily occur to one skilled in the art.

I claim:

1. In a truck, a pair of steering and load supporting wheels, an axle, said wheels being mounted at each end of said axle for rotary movement, a plurality of single axis bearing means for mounting said axle for universal tractive movement relatively to said truck, and steering means operatively associated with said axle and operable to rotate the same about one of said bearing means comprising a vertical pivot.

2. In a truck, a pair of steering and load supporting wheels, an axle, said wheels being mounted at each end of said axle for rotary movement, a plurality of single axis bearing means for mounting said axle for universal tractive movement relatively to said truck, steering means operatively associated with said axle and adapted to move the same about one bearing means for steering the truck, said axle being automatically movable about two additional bearing means by the irregularity of the way traversed by said wheels.

3. In a truck, a pair of axles, wheels mounted for rotary movement at each end of said axles, means for mounting each of said axles for universal tractive movement relatively to said truck, and steering means operatively and individually associated with each of said axles and adapted to rotate the same about vertical pivots.

4. In a truck, a pair of axles, wheels mounted for rotary movement at each end of said axles, means for mounting each of said axles for universal tractive movement relatively to said truck, steering means operatively associated with said axles and adapted to move the same about two parallel axes, said axles being each movable about two additional axes by the irregularity of the way traversed by said wheels.

5. In a truck, a pair of axles, wheels mounted for rotary movement at each end of said axles, means for mounting each of said axles for universal tractive movement relatively to said truck, said means comprising means individual relatively to each axle for mounting the same for movement about two axes, and means common to both axles for mounting the same for movement about a third axis.

6. In a truck, a pair of axles, wheels mounted for rotary movement at each end of said axles, means for mounting each of said axles for universal tractive movement, said means comprising a member movable in one plane, a pair of members carried by said member, each of said pair of members having one of said axles mounted thereon for movement about a longitudinal pivot, each of said pair of members being mounted for movement on a vertical pivot carried by said first member, and steering apparatus adapted to move said pair of members on said pivots.

7. In a truck, an axle, means for mounting said axle for steering movement on a vertical pivot, means for mounting said axle on a longitudinal pivot, and means for mounting said axle for movement about a transverse pivot.

8. In a truck, an axle, means for mounting said axle about a vertical pivot midway of the length of said axle, means for mounting said axle about a longitudinal pivot midway of the length of said axle, and means acting to connect said axle to the truck for operative relation thereto, said means being mounted for pivotal movement about a transverse pivot.

9. In a truck, an axle, a wheel mounted for rotation at each end of said axle, a bearing member, said axle being mounted on said bearing member for movement about a longitudinal axis, a second bearing member, said first bearing member being mounted on said second bearing member for rotation about a vertical axis, said second bearing member being mounted for movement on said truck about a transverse axis.

10. In a truck, an axle, a wheel mounted for rotation at each end of said axle, a bearing member, said axle being mounted on said bearing member for movement about a longitudinal axis, a second bearing member, said first bearing member being mounted on said second bearing member for rotation about a vertical axis, steering apparatus for said truck adapted to rotate said first bearing member about said vertical axis, said second bearing member being mounted for movement on said truck about a transverse axis.

11. In a truck, a pair of spaced axles, wheels mounted for rotation on each of said axles, a bearing member for each of said axles, each of said axles being pivoted to its bearing member about a longitudinal pivot, a bearing beam, each of said first bearing members being pivotally mounted at the extremities of said beam for movement about a vertical axis on said beam, and means for mounting said beam on said truck for movement about a transverse axis.

12. In a truck, a pair of spaced axles, wheels mounted for rotation on each of said axles, a bearing member for each of said axles, each of said axles being pivoted to its bearing member about a longitudinal pivot, a bearing beam, each of said first bearing members being pivotally mounted at the extremities of said beam for movement about a vertical axis on said beam, truck steering means secured to each of said bearing means and adapted to rotate the same about said vertical pivots, and means for mounting said beam on said truck for movement about a transverse axis.

13. In a truck, a forward power carrying portion, wheels for supporting said portion, a solid unitary forged relatively narrow bar of substantial cross section extending rearwardly from said forward portion and itself constituting the load supporting portion and the frame of said truck, a wheel supporting beam carried by said bar, said beam being mounted on a transverse pivot carried by said bar, a pair of axle bearings carried by said beam, said bearings being mounted on vertical pivots on the beam, and axles mounted on said axle bearings and rotatable about longitudinal pivots on said bearings.

14. In a lift truck, a frame, a beam mounted to pivot on said frame about a transverse pivot, a pair of axles secured to said beam, steering means carried by said beam and movable therewith, means of connection between said steering means and said axles for steering said axles, and universal means of connection between said steering means and a steering rod mounted on the truck frame.

15. In a lift truck, a frame, a transverse pivot on said frame, a beam mounted on said pivot so as to rotate relatively to said truck, a pair of axles secured to said beam, steering means for said axles mounted on said beam for movement therewith, means for actuating said steering means relatively to said beam, and universal means of connection between said means and said steering means.

16. In a lift truck, a frame, a transverse pivot on said frame, a beam mounted on said pivot so as to rotate relatively to said truck, a pair of vertical pivots carried by said beam, a pair of axles mounted for movement about said pivots, steering means for said axles mounted on said beam and adapted to rotate said axles about said pivots, and a universal means of connection between said steering means and operating means therefore carried by said truck frame.

17. In a lift truck, a frame, a wheel supporting beam mounted to rotate about a transverse axis relatively to said frame, a pair of axles carried by said beam and adapted to rotate about vertical pivots relatively thereto, a steering mechanism also mounted on a vertical pivot on said beam and having means of connection with said axles, and a steering rod on said truck operatively connected with said steering mechanism.

18. In a lift truck, a frame, a wheel assembly supporting beam mounted to pivot about a transverse axis relatively to said frame, a pair of axle mountings carried by said beam and adapted to rotate about vertical pivots relatively thereto, an axle carried by each of said mountings and mounted to pivot about a longitudinal pivot relatively thereto, a steering mechanism mounted on a vertical pivot relatively to said beam and having means of connection with each of said axle bearings, and a steering rod on said truck operatively associated with said steering mechanism.

CHARLES S. SCHROEDER.